United States Patent [19]

Sakuma et al.

[11] Patent Number: 4,712,884
[45] Date of Patent: Dec. 15, 1987

[54] LENS SYSTEM FOR DEFLECTED LIGHT BEAM

[75] Inventors: Nobuo Sakuma, Tokyo; Keinichi Takanashi, Kanagawa, both of Japan

[73] Assignee: Ricoh Company, Ltd., Tokyo, Japan

[21] Appl. No.: 823,002

[22] Filed: Jan. 27, 1986

[30] Foreign Application Priority Data

Jan. 30, 1985 [JP] Japan .................. 60-016002

[51] Int. Cl.$^4$ .................. G02B 13/18; G02B 9/12; G02B 26/10
[52] U.S. Cl. .................. 350/434; 350/6.8; 350/474; 350/477
[58] Field of Search .................. 350/6.1, 6.8, 434, 479, 350/480, 474, 477

[56] References Cited

U.S. PATENT DOCUMENTS

| | | | |
|---|---|---|---|
| 1,091,933 | 3/1914 | Humbrecht | 350/560 |
| 3,045,545 | 7/1962 | Korones et al. | 350/560 |
| 3,900,851 | 8/1975 | Bucy et al. | 346/49 |
| 3,973,833 | 8/1976 | Lawson | 350/481 |
| 4,179,183 | 12/1979 | Tateoka et al. | 350/6.1 |
| 4,269,478 | 5/1981 | Maeda et al. | 350/465 |
| 4,277,128 | 7/1981 | Kawamura | 350/6.8 |
| 4,343,531 | 8/1982 | Tateoka et al. | 350/474 X |
| 4,353,617 | 10/1982 | Tokumitsu et al. | 350/6.8 |
| 4,357,627 | 11/1982 | Johnson | 358/348 |
| 4,390,235 | 6/1983 | Minoura | 350/6.1 |
| 4,400,063 | 8/1983 | Hayashida | 350/415 |
| 4,401,362 | 8/1983 | Maeda | 350/6.8 |
| 4,436,383 | 3/1984 | Maeda | 350/469 |
| 4,496,209 | 1/1985 | Itoh et al. | 350/434 X |
| 4,497,548 | 2/1985 | Burris | 350/560 |
| 4,571,035 | 2/1986 | Sakuma | 350/6.8 X |

OTHER PUBLICATIONS

How to Select Acousto-Optic Modulators, Barry Grossman, Harris Corporation, Government Communications System Division.

Primary Examiner—Bruce Y. Arnold
Assistant Examiner—Scott J. Sugarman
Attorney, Agent, or Firm—Oblon, Fisher, Spivak, McClelland & Maier

[57] ABSTRACT

A lens system for use in a light beam scanner for deflecting a monochromatic or quasi-monochromatic light beam, the lens system being disposed between a deflection point about which the light beam is deflected and a surface to be scanned in the light beam scanner. The lens system comprises an f$\theta$ lens and a corrective lens. The f$\theta$ lens comprises two positive-meniscus lenses with their concave surfaces directed toward the deflection point, the f$\theta$ lens having an effective deflection angle of at least 50 degrees. The corrective lens cooperates with the f$\theta$ lens in constituting a surface irregularity correcting optical system and is disposed between the f$\theta$ lens and the surface to be scanned. The corrective lens comprises a toroidal lens capable of correcting surface irregularity and curvature of field.

10 Claims, 4 Drawing Figures

LENS SYSTEM FOR DEFLECTED LIGHT BEAM

BACKGROUND OF THE INVENTION

1. Field of the Invention

The present invention relates to a lens system for a deflected light beam and more particularly to a lens system including an fθ lens and a corrective lens.

2. Discussion of the Background

Light beam scanners for deflecting a monochromatic light beam such as a laser beam or a quasimonochromatic light beam such as a light beam emitted from a monochromatic fluorescent lamp are heretofore widely known in relation to optical printers and information readout devices.

In such light beam scanners, a lens system for a deflected light beam is disposed between a deflection point about which the light beam is deflected and a surface to be scanned by the light beam. The lens system is generally composed of an fθ lens and a corrective lens.

The fθ lens serves to correct the light path of the light beam deflected at a constant speed for equalizing the speed of movement of a beam spot on the surface being scanned. The direction in which the scanning beam spot moves on the surface being scanned is referred to as a main scanning direction, whereas the direction normal to the main scanning direction is referred to as an auxiliary scanning direction.

The corrective lens cooperates with the fθ lens in constituting a surface irregularity correcting optical system, and is generally in the form of a cylindrical lens. The term "surface irregularity" used herein typically means an inclination of a mirror surface of a rotating polygonal mirror out of parallel with adjacent mirror surfaces, i.e., the axis of the rotating polygonal mirror. Surface irregularity correction means the prevention of the position of the scanning beam spot from being subjected to fluctuations in the auxiliary scanning direction which would otherwise arise from surface irregularities, i.e., variations in the direction of the reflecting mirror surfaces of a rotating polygonal mirror or the disc surfaces of a hologram grating disc. The fθ lens and the corrective lens are used to keep the deflection point and the position of the main scanning line in conjugate relation to each other in the auxiliary scanning direction.

Conventional fθ lenses that have been prevalent in the art have relatively small effective deflection angles of 50 degrees or less. However, there has recently been proposed the use of an fθ lens having an effective deflection angle of 50 degrees or more (see, for example, Japanese Laid-Open Patent Publication No. 59(1984)-147316).

It is known that an increase in the effective deflection angle of an fθ lens would result in an increase in the curvature of field in the auxiliary scanning direction. Therefore, there has been a demand for a lens system for a deflected light beam which has a large effective deflection angle with the curvature of field being compensated.

SUMMARY OF THE INVENTION

Therefore, it is an object of the present invention to provide a novel lens system for a deflected light beam which has a large effective deflection angle with the curvature of field being compensated.

According to the present invention, a lens system for a deflected light beam comprises an fθ lens and a corrective lens, which jointly consititute a surface irregularity correcting optical system. The fθ lens comprises two positive-meniscus lenses and has an effective deflection angle of 50 degrees or more. The two meniscus lenses have concave surfaces directed toward a deflection point for a light beam.

The corrective lens is in the form of a toroidal lens disposed between the fθ lens and a surface to be scanned. The toroidal lens is capable of compensating for both surface irregularity and curvature of field.

The toroidal lens has a cylindrical lens surface which faces the image and has a power in the main scanning direction, and a toroidal lens surface which faces an object and is formed by rotating an arc about an axis parallel to the main scanning direction. Therefore, the toroidal lens surface is of a shape analogous to a portion of the spherical surface of a known hourglass wheel or a saddle shape.

Since the fθ lens of the lens system is composed of two positive-meniscus lenses, the effective deflection angle of the lens system is large, i.e., 50 degrees or greater. It is possible for the effective deflection angle to be 100 degrees or larger, as described later in Examples of the invention.

The corrective lens in the form of a toroidal lens can compensate for surface irregularity and curvature of field.

The above and other objects, features and advantages of the present invention will become more apparent from the following description when taken in conjunction with the accompanying drawings in which a preferred embodiment of the present invention is shown by way of illustrative example. A more complete appreciation of the invention and many of the attendant advantages thereof will be readily obtained as the same becomes better understood by reference to the following detailed description when considered in connection with the accompanying drawings, wherein:

Figure 1:
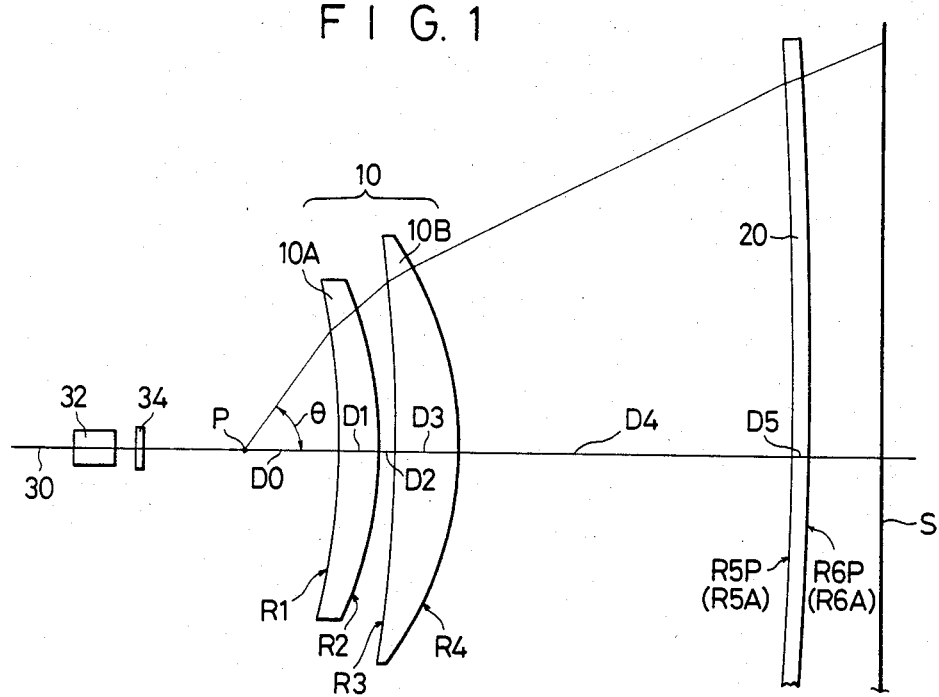
FIG. 1 is a schematic view of a lens system for a deflected light beam according to the present invention.

Various other objects, features and attendant advantages of the present invention will be more fully appreciated as the same becomes better understood from the following detailed description when considered in connection with the accompanying drawings in which like reference characters designate like or corresponding parts throughout the several views and wherein:

DESCRIPTION OF THE PREFERRED EMBODIMENT

Figure 4:
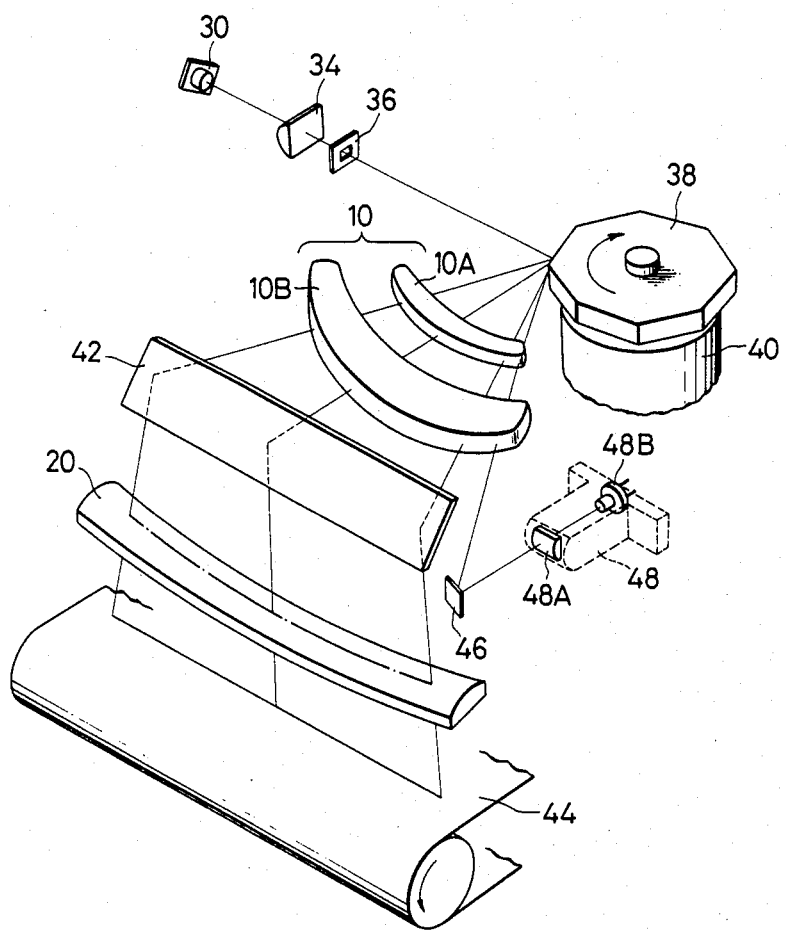
FIG. 4 is a schematic perspective view of an optical printer employing the lens system according to the present invention.

FIG. 4 shows an optical printer employing a lens system for a deflected light beam according to the present invention.

A laser beam emitted from monochromatic light beam source 30 comprising a semiconductor laser 30 is adjusted by a collimator lens (not shown) into parallel rays. The parallel-ray laser beam is then passed through a beam-shaping cylindrical lens 34 and an aperture 36 to fall on a rotating polygonal mirror 38. The light beam reflected and deflected by the rotating polygonal mirror 38 is then passed through an fθ lens 10 comprising positive-meniscus lenses 10A, 10B, reflected by a flat mirror 42, and then travels through a toroidal lens 20. Thereafter, the light beam impinges upon a photoconductive, belt-shaped photosensitive body 44 as a scanning spot thereon. The light beam from the lens 10B can be reflected by a flat mirror 46 and detected by a synchronizing light detector 48.

By rotating the rotating polygonal mirror 38 in the direction of the arrow with a motor 40, the scanning spot of the deflected light beam moves on the surface of the photosensitive body 44 to optically scan the same. Therefore, an image can be recorded on the photosensitive body 44 through the known electrophotographic process by modulating the light beam from the semiconductor laser 30 with an image signal, and exposing the photosensitive body 44 to the modulated light beam which scans the photosensitive body 44 while the latter is being moved.

The synchronizing light detector 48 has a cylindrical lens 48A and a light detector element 48B for detecting the deflected light beam as a synchronizing light in each beam deflecting cycle and for generating a timing signal to align the starting points of optical scanning cycles.

The photosensitive body may comprise a drum rather than the illustrated belt.

FIG. 1 illustrates the optical system of the optical printer, as developed along the optical path. Designated at P is a deflection point where the light beam is deflected by the rotating polygonal mirror 38. S is the surface to be scanned.

The fθ lens 10 and the toroidal lens 20 jointly constitute a lens system for a deflected light beam according to the present invention.

It is assumed that the lens surfaces of the lens system have radii of curvature R1, R2, R3, R4, R5P(R5A), R6P(R6A) in order from the deflection point P toward the surface S, and the distances between lens surfaces are denoted by D1, D2, D3, D4, D5, respectively, in order from the deflection point P toward the surface S, as shown in FIG. 1. The deflection point P and the first lens surface (having the radius of curvature R1) of the fθ lens 10 are spaced from each other by a distance D0.

Designated at $\theta$ in FIG. 1 is a deflection angle. When the scanning speed (the speed of movement of the scanning beam spot on the surface S) in a deflection angle range of from $-\theta_{MAX}$ to $+\theta_{MAX}$ is constant, $2\theta_{MAX}$ is referred to as an effective deflection angle.

If the meniscus lenses 10A, 10B of the fθ lens 10 are symmetrical with respect to their optical axis, the radii of curvature of the lens surfaces are the same in both the main scanning direction and the auxiliary scanning direction. However, the lens surfaces of the toroidal lens 20 have different radii of curvature in respective directions parallel to the main and auxiliary scanning directions. The auxiliary scanning direction is normal to the sheet of FIG. 1. The radii of curvature R5P, R6P are those in the direction parallel to the main scanning direction, i.e., those of the lens surfaces appearing in FIG. 1, and the radii of curvature R5A, R6A are those in the direction parallel to the auxiliary scanning direction. The toroidal lens surface of the toroidal lens 20 facing the fθ lens 10 is generated by rotating a surface of the radius of curvature R5P about an axis parallel to the main scanning direction.

Two Examples will be described below. In each Example, the meniscus lenses 10A, 10B and the toroidal lens 20 are made of BK7, SF11, and polymethyl methacrylate. The values given below are standardized with f = 100.0. The object-facing lens surface of the toroidal lens 20 is a toroidal surface, and the image-facing surface thereof is a cylindrical surface. The value of R5A is a value on the optical axis.

(EXAMPLE 1)

| Effective deflection angle: 106 degrees, D0 = 27 | |
|---|---|
| R1 = −189.965 | |
| | D1 = 13.0 |
| R2 = −105.063 | |
| | D2 = 3.5 |
| R3 = −449.805 | |
| | D3 = 19.0 |
| R4 = −102.095 | |
| | D4 = 100.0 |
| R5P = −2010.0 | |
| (R5A = 10.5) | D5 = 5.0 |
| R6P = −2015.0 | |
| (R6A = ∞) | |

Figure 2:
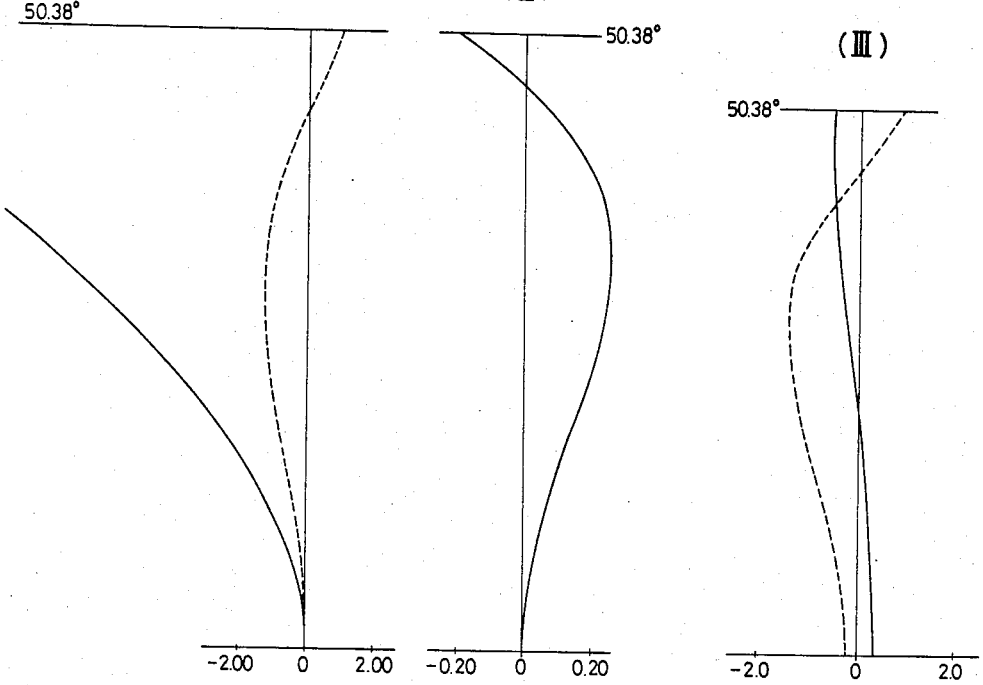
FIGS. 2 and 3 are diagrams each showing curvature of field and fθ characteristics.

FIG. 2 shows aberrations of the lens system according to Example 1. FIG. 2(I) illustrates curvature of field plotted when the fθ lens 10 was used singly. The solid-line curve shows a curvature of field in the auxiliary scanning direction, and the broken-line curve shows a curvature of field in the main scanning direction. It is clear from FIG. 2(I) that the curvature of field in the auxiliary scanning direction is quite large with an f lens having a large effective deflection angle. FIG. 2(II) shows fθ characteristics of the fθ lens 10. FIG. 2(III) shows curvature of field of the entire lens system including the toroidal lens 20. In FIG. 2(III), the broken-line curve shows a curvature of filed in the main scanning direction, and the solid-line curve shows a curvature of field in the auxiliary scanning direction, with the vertical axis indicating the deflection angle $\theta$. The effective deflection angle in this Example is 106 degrees as described above, but up to half (50.38 degrees) of that effective deflection angle which is used in actual optical scanning is shown in FIG. 2.

It is apparent from FIG. 2(III) that the curvature of field of the fθ lens 10 in the auxiliary scanning direction is effectively conpensated for by the presence of the toroidal lens 20. The curvature of field X in the auxiliary scanning direction, the curvature of field Y in the main scanning direction, and the deflection angle in Example 1 are numerically shown in Table 1 below. The graph of FIG. 2(III) is a graphic representation of the values given in Table 1.

TABLE 1

| Deflection angle (degrees) | X | Y |
|---|---|---|
| 0 | 0.3511 | −0.2072 |
| 12.56232 | 0.2196 | −0.6324 |
| 25.08859 | −0.1117 | −1.3460 |
| 37.63125 | −0.4621 | −1.0159 |
| 50.38158 | −0.5278 | 0.8535 |
| 53.76277 | −0.4427 | 1.0795 |
| 58.68912 | −0.2058 | 1.2195 |

(EXAMPLE 2)

| Effective deflection angle: 103 degrees, D0 = 32 | |
|---|---|
| R1 = −239.988 | |
| | D1 = 16.00 |
| R2 = −129.906 | |
| | D2 = 4.00 |

-continued

Effective deflection angle: 103 degrees, D0 = 32

R3 = −449.900
　　　　　　　　　D3 = 22.00
R4 = −118.803
　　　　　　　　　D4 = 126.200
R5P = −2945.000
(R5A = 10.5)　　　D5 = 5.00
R6P = −2950.000
(R6A) = (∞)

Figure 3:
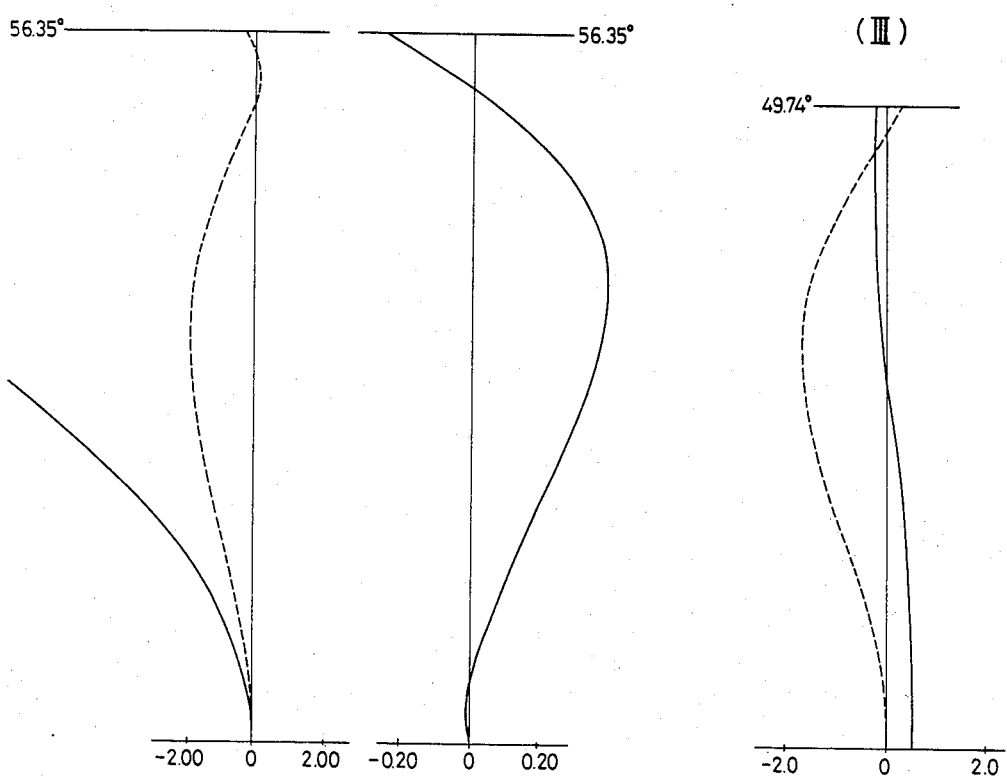

FIG. 3 shows aberrations of the lens system according to Example 2. FIG. 3(I) illustrates curvature of field plotted when the fθ lens 10 was used singly. The curvature of field in the auxiliary scanning direction (indicated by the solid-line curve) is quite large, whereas the curvature of field in the main scanning direction (indicated by the broken-line curve) is good. FIG. 3(II) shows fθ characteristics of the fθ lens 10. FIG. 3(III) shows curvature of field of the entire lens system including the toroidal lens 20. The curvature of field in the auxiliary scanning direction (indicated by the solid-line curve) is compensated for quite well by the presence of the toroidal lens. Up to 49.74 degrees used in actual optical scanning is shown in FIG. 3(III).

Numerical values of the curvatures of field shown in FIG. 3(III) are given in Table 2 below in which X indicates those in the auxiliary scanning direction and Y in the main scanning direction).

TABLE 2

| Deflection angle (degrees) | X | Y |
|---|---|---|
| 0 | 0.5699 | 0.0627 |
| 12.43305 | 0.4449 | −0.4844 |
| 24.81939 | 0.1261 | −1.4918 |
| 37.19693 | 0.2246 | −1.4515 |
| 49.73730 | −0.3357 | 0.3089 |
| 52.32163 | −0.2933 | 0.5355 |
| 56.34965 | −0.1622 | 0.184 |

In each Example, the light beam expected is monochromatic light having a wavelength of 780 nm. Chromatic aberration is also not problematic with the lens system since the light beam used in light beam scanners is generally monochromatic light or quasi-monochromatic light. Spherical aberration and coma also cause no problem as the diameter of the deflected light beam is small as compared with the lens aperture. The fθ characteristics of respective Examples (FIGS. 2(II) and 3(II)) are quite good.

The lens system constructed as above has quite a large effective deflection angle and good fθ characteristics. The curvature of field is also compensated for.

Since the effective deflection angle is large, the length of the optical path between the deflection point and the surface being scanned in a light beam scanner can be shortened, and hence the light beam scanner can be made compact. The light beam scanner employing the lens system of the present invention is applicable to not only an optical printer but also an information read-out device.

Although a certain preferred embodiment has been shown and described, it should be understood that many changes and modifications may be made therein without departing from the scope of the appended claims.

What is claimed is:

1. A light beam scanner comprising:
   means for producing a scanning light beam; and
   a lens system including two positive-meniscus lenses and a toroidal lens, said two positive-meniscus lenses having their concave surfaces directed towards said means for producing a scanning light beam, said two positive-meniscus lenses havign an effective deflection angle of at least 50°, said toroidal lens correcting for surface irregularity and curvature of field.

2. A light beam scanner comprising:
   a light beam source for producing a light beam;
   a rotating polygonal mirror for deflecting said light beam in a scanning direction;
   an fθ lens including two positive mensicus lenses with their concave surfaces directed towards said rotating polygonal mirror, said fθ lens having an effective deflective angle of at least 50°, each of said two positive mensicus lenses being symmetrical;
   a toroidal lens cooperating with said fθ lens for correcting surface irregularity and curvature of field; and
   a surface to be scanned, for receiving said light beam in a scanning line across said surface.

3. A light beam scaner according to claim 2, wherein said light beam is monochromatic.

4. A light beam scanner according to claim 2, wherein said light beam is quasi-monochromatic.

5. A lens system for use in a light beam scanner for deflecting a light beam, the lens system being adapted to be disposed between a deflection point about which the light beam is deflected and a surface to be scanned in the light beam scanner, said lens system comprising:
   an fθ lens composed of two poitive-meniscus lenses with their concave surfaces adapted to be directed toward said deflection point, said fθ lens having an effective deflection angle of at least 50 degrees; and
   a corrective lens cooperating with said fθ lens in constituting a surface irregularity correcting optical system, said correcting lens comprising a toroidal lens adapted to be disposed between said fθ lens and said surface to be scanned for correcting surface irregularity and curvature of field, said toroidal lens having a cylindrical surface which faces an image and has a power in the main scanning direction and a toroidal surface which faces an object and is formed by rotating an arc about an axis parallel to the main scanning direction and a ridge of saddle shape and cylindrical surface are arranged parallel respectively.

6. A lens system according to claim 5, wherein the light beam is monochromatic.

7. A lens system according to claim 5, wherein said light beam is quasi-monochromatic.

8. A lens system according to claim 5, wherein said light beam is deflected by a rotating polygonal mirror.

9. A lens system according to claim 5, wherein said two positive-meniscus lenses are symmetrical with respect to their optical axes.

10. A lens system according to claim 9, wherein said toroidal lens has a different radius of curvature in the scanning direction than in the direction perpendicular to the scanning direction.

* * * * *